United States Patent Office 3,521,433
Patented July 21, 1970

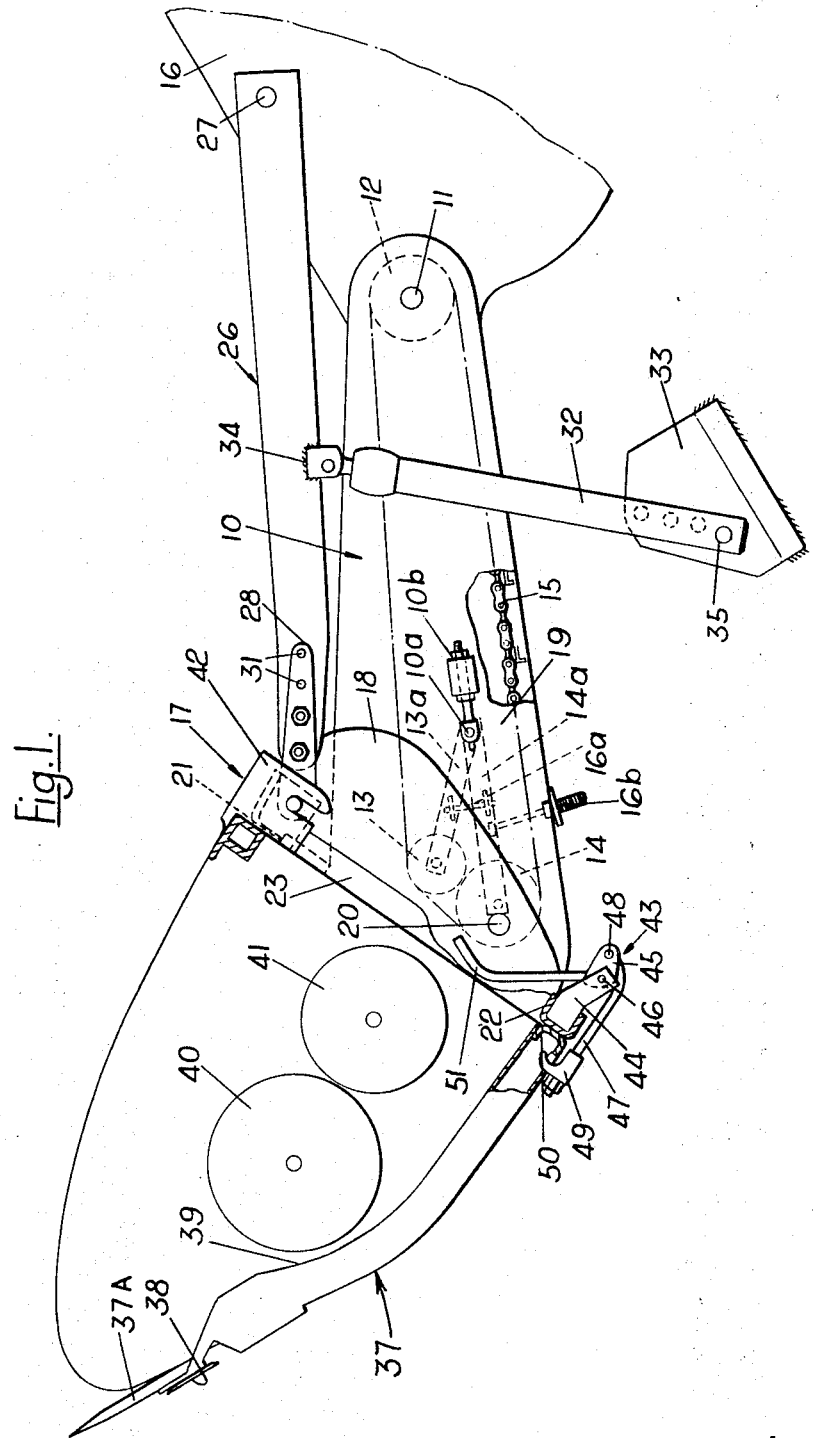

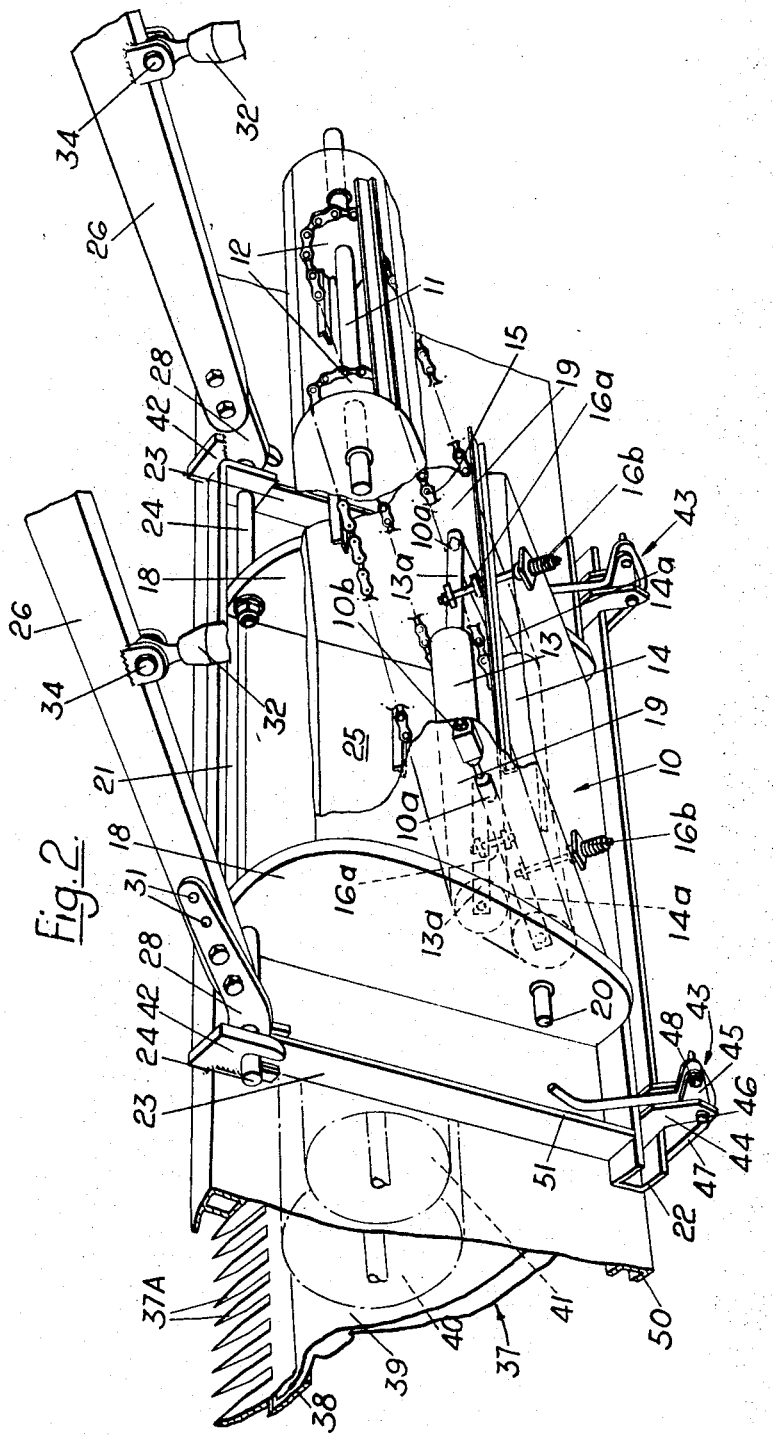

3,521,433
AGRICULTURAL COMBINE HAVING TABLE SUPPORTED FOR PARALLEL MOVEMENT
Ernest W. Wright, St. Kilda, Victoria, and John B. Thomas, Avondale Heights, Victoria, Australia, assignors to Massey-Ferguson (Australia) Limited, Victoria, Australia
Filed Nov. 3, 1967, Ser. No. 681,068
Int. Cl. A01d *41/02*
U.S. Cl. 56—20    3 Claims

ABSTRACT OF THE DISCLOSURE

A combine having a header with a harvesting table pivotally connected to one end of the elevator, the other end of the elevator being pivotally connected to the combine body. The table is further connected to the body through links substantially parallel to the elevator so that the table is maintained at a substantially constant attitude relative to the ground as it is raised and lowered.

---

This invention relates to a combine harvester of the type including a table adjustable in height relative to the ground and carrying a crop gathering mechanism, for example, a conventional cutting knife, or a header in which the crop gathering mechanism includes a stripper comb comprising a series of fingers which engage the crop underneath the heads which are severed by a knife.

According to the present invention, a combine harvester carries at its front end a height adjustable table which is connected to the body of the harvester by a substantially parallel linkage so that the table maintains a substantially constant angle to the ground in the positions to which it may be height adjusted.

The table may carry a stripper comb and knife, the comb and knife maintaining a substantially constant angle to the ground at different heights of adjustment.

One of the links of said parallel linkage may be constituted by the elevator.

An embodiment of the invention will now be described, by way of example, with reference to the accompanying drawings, in which:

FIG. 1 is a side view of a front end portion of a combine harvester, of the kind referred to as a header, according to the invention, and FIG. 2 is a perspective view corresponding to FIG. 1, some parts being broken away for clarity.

The front end portion of the header shown in the drawings includes an elevator and parts which are in front of the latter. The elevator includes a casing 10 through the upper end of which passes a shaft 11 carrying sprockets 12. At the lower end of the casing 10 there are two rollers 13, 14 and the chains of a conventional undershot chain-and-slat conveyor 15 are entrained around the sprockets 12 and rollers 13, 14.

The rollers 13, 14 are carried respectively at the lower ends of pairs of arms 13A, 14A which are pivotally connected at their upper ends to a shaft 10A in the casing 10. The shaft 10A is movable longitudinally of the casing by screw adjusters 10B, and a screw adjuster 16A and spring arrangement 16B are provided for adjusting the angle between the arms 13A, 14A. The tension in the conveyor chains may thus be adjusted. The shaft 11 also acts as a pivot on the body of the combine for the elevator.

An attaching frame 17 has a pair of lugs or plates 18 projecting rearwardly therefrom and located one on either side of side walls 19 of the elevator, and mounted on pins 20 pivotally mounted on the walls 19 of the elevator. The plates 18 are interconnected at their upper ends by a transverse frame member 21, and at their lower ends by a channel section member 22 so as to form a generally rectangular opening 25 through which crop passes to the elevator. A pair of stiffening bars 23 are spaced outwardly, one from each plate 19, and act as outer supports for pins 24 projecting laterally from the plates 18.

Link arms 26 extend generally parallel to the axis of and above the elevator 15 and are pivoted at their rear ends to the combine body 16 by a torsion bar 27. An extension link 28 is bolted to the front end of each link arm 26 and is pivotally mounted on the pins 24. A plurality of holes 31 is provided in each link 28 so that the length of the resulting link arm assembly may be adjusted. Hydraulic jacks 32 are pivotally mounted at their lower ends at 35 on brackets 33 attached to the combine body 16 and at their upper ends to pivots 34 provided on their associated link arms 26. Thus, extension or contraction of the jacks causes the link arms 26 together with the elevator and the attaching frame, to be raised or lowered, and, due to the generally parallel relationship between the links 26 and the elevator, the attaching frame 17 maintains a substantially constant angle with the ground. Also the plates 18 extend far enough rearwardly beyond the leading end of the elevator so that, despite articulation of the frame 17 relative to the elevator, there is no resulting gap between them.

A table 37 carries a stripper comb having fingers 37A between which crop is received with the heads above the fingers 37. On forward travel of the table, the heads are cut off at the rear ends of the fingers 37A by the stripper knife 38 and fall onto the floor 39 of the table 37. The heads are then collected by an auger 40 and a feed member 41 in a conventional manner and brought to the center of the table 37 and fed to the elevator.

The table 37 is connected to the attaching frame 17 by means of hooks 42 which are on the back wall of the table and which pass over the pins 24, and are held in position by locks 43. Each lock 43 consists of a bracket 44 projecting rearwardly from the channel member 22 on the attaching frame 17. A lever 45 is pivotally mounted on the bracket 44 at 46, and a lock rod 47 is pivotally connected at 48 to the lever 45. The lock rod 47 carries at its forward extremity a latch member 49 which engages on a channel section member 50 which forms a bottom reinforcement for the table 37. A handle 51 for actuating the locking mechanism is mounted on the lever 45. The locks 43 are of the over-center-type. That is to say, in the locked position, the pivot 48 is above the line extending between the contact point of the lock member 49 with the channel member 50 and the pivot 46; whereas when it is unlocked the pivot 48 is below that line.

This arrangement of the table provides a facility of easy interchange between, for instance, the header table and a more conventional combine table, and also allows the table to be quickly removed, so that the overall width of the combine may easily be reduced for transport purposes. Thus, to remove the table all that is necessary is to turn the handle 51 in a clockwise direction, as viewed in FIG. 1, to unlock the latches 49. The table may then be lowered to the ground or onto a transport trolley by contracting the jacks 32, so that the hooks 42 automatically become disengaged from the pins 24.

As above mentioned, the attaching frame 17 remains at a substantially constant attitude to the ground and since the table is attached to it, the table 37 and the fingers 37A of the comb, and the knife 38 likewise remain at a substantially constant attitude which may quite easily be changed for different crop conditions by adjustment of the length of the link arms 26.

What we claim is:

1. A combine harvester including a main body, an elevator and a harvesting table, the elevator for conveying crop material from the table to the main body having its rear end pivotally connected to the main body for pivotal movement about a horizontal axis, an attaching frame pivotally mounted on a front portion of the elevator for pivotal movement about a horizontal axis, linkage means substantially the same length as the elevator and parallel with the elevator pivotally connected to the main body of the harvester and to the attaching frame so that the attaching frame maintains substantially a constant angle relative to the ground when the elevator is pivoted about its pivotal connection to the main body, a harvesting table, hook means on the upper portion of the attaching frame arranged to engage corresponding hook means on the table to attach the table to the front side of the attaching frame, locking means for locking the table to the attaching frame, and at least one hydraulic cylinder for pivoting the elevator about its pivotal connection with the main body to raise and lower the table relative to the ground while the table is held at a substantially constant angle relative to the ground by the attaching frame.

2. The combine harvester according to claim 1 wherein said linkage means includes two links mounted above the elevator.

3. The combine harvester according to claim 1 wherein said locking means includes at least one overcenter locking device to lock the lower portion of the table to the attaching frame.

References Cited

UNITED STATES PATENTS

| | | | |
|---|---|---|---|
| 1,196,430 | 8/1916 | Burchell | 56—23 |
| 2,170,573 | 8/1939 | Pierson | 56—20 X |
| 2,674,082 | 4/1954 | Ryden | 56—23 X |
| 3,038,287 | 6/1962 | Vincent | 56—23 |
| 3,043,076 | 7/1962 | Scheidenhelm | 56—23 X |

F. BARRY SHAY, Primary Examiner

J. A. OLIFF, Assistant Examiner

U.S. Cl. X.R.

56—208